United States Patent
Roessler et al.

(10) Patent No.: US 9,634,553 B2
(45) Date of Patent: Apr. 25, 2017

(54) METHOD AND CONTROL DEVICE FOR PROTECTION TIME SETTING IN AN ELECTRIC DRIVE SYSTEM

(75) Inventors: Julia Roessler, Vaihingen/Enz (DE); Martin Trunk, Moeglingen (DE); Andreas Schoenknecht, Renningen (DE); Tim Bruckhaus, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 14/114,282

(22) PCT Filed: Feb. 28, 2012

(86) PCT No.: PCT/EP2012/053321
§ 371 (c)(1),
(2), (4) Date: Nov. 22, 2013

(87) PCT Pub. No.: WO2012/146412
PCT Pub. Date: Nov. 1, 2012

(65) Prior Publication Data
US 2014/0062368 A1   Mar. 6, 2014

(30) Foreign Application Priority Data
Apr. 28, 2011 (DE) .......................... 10 2011 017 712

(51) Int. Cl.
*G05B 9/02* (2006.01)
*H02M 1/32* (2007.01)
(Continued)

(52) U.S. Cl.
CPC ............... *H02M 1/32* (2013.01); *B60L 3/003* (2013.01); *B60L 3/04* (2013.01); *B60L 11/1803* (2013.01);
(Continued)

(58) Field of Classification Search
USPC ........... 318/454, 434, 811, 452, 400.14, 293, 318/563, 400.21, 400.22, 707, 782;
(Continued)

(56) References Cited

U.S. PATENT DOCUMENTS 4,270,164 A * 5/1981 Wyman et al. ............ 363/56.03
4,819,157 A * 4/1989 Hirose et al. ............. 363/56.03
(Continued)

FOREIGN PATENT DOCUMENTS

DE   2557710   6/1977
DE   2645476   4/1978
(Continued)

OTHER PUBLICATIONS

International Search Report for Application No. PCT/EP2012/053321 dated Apr. 12, 2013 (English Translation, 3 pages).

*Primary Examiner* — Jorge L Carrasquillo
(74) *Attorney, Agent, or Firm* — Michael Best & Friedrich LLP

(57) ABSTRACT

The invention relates to a control device (12) for actuating a pulse-controlled converter of an electric drive system, having: an open-loop/closed-loop control circuit (12a) which is configured to generate pulse-width-modulated actuation signals for switching devices of the pulse-controlled converter; a fault logic circuit (12b) which can detect fault states in the drive system and which is configured to select a switching state or a sequence of switching states for the switching devices of the pulse-controlled converter which are assigned to the corresponding fault state; and a protection circuit (12c) which is embodied in hardware and which comprises a signal delay device (15), which is configured to delay the actuation signals in order to implement a minimum protection time, and a locking device (16a, 16b) which is configured to lock two complementary switching devices of a bridge branch of the pulse-controlled converter with respect to one another.

5 Claims, 5 Drawing Sheets

(51) Int. Cl.
*B60L 3/00* (2006.01)
*B60L 3/04* (2006.01)
*B60L 11/18* (2006.01)
*H02M 1/38* (2007.01)
*H02P 3/02* (2006.01)

(52) U.S. Cl.
CPC ................ *H02M 1/38* (2013.01); *H02P 3/02* (2013.01); *Y02T 10/7005* (2013.01)

(58) Field of Classification Search
USPC .......... 361/94, 71, 86, 101, 18, 89, 90, 91.3, 361/534; 332/109, 110; 363/132, 71, 50, 363/56.03; 324/522; 375/238
See application file for complete search history.

(56) References Cited

U.S. PATENT DOCUMENTS

| | | | | |
|---|---|---|---|---|
| 4,924,158 | A * | 5/1990 | Kelley | H02H 7/0838 318/293 |
| 5,978,195 | A * | 11/1999 | Goder et al. | 361/94 |
| 8,558,415 | B2 * | 10/2013 | Fujita | G05B 9/02 307/326 |
| 8,605,471 | B2 * | 12/2013 | Ogura et al. | 363/56.03 |
| 2001/0026429 | A1 * | 10/2001 | Fukuda | H03K 17/168 361/93.9 |
| 2002/0101751 | A1 * | 8/2002 | Wade | 363/125 |
| 2005/0030045 | A1 * | 2/2005 | Deng | G01R 31/025 324/522 |
| 2007/0002506 | A1 * | 1/2007 | Papallo | H02H 7/30 361/38 |
| 2010/0327667 | A1 * | 12/2010 | Fujita et al. | 307/326 |

FOREIGN PATENT DOCUMENTS

| | | |
|---|---|---|
| DE | 9413274 | 10/1994 |
| DE | 102006003254 | 7/2007 |
| DE | 102010024234 | 1/2011 |
| EP | 1619782 | 1/2006 |
| EP | 1619782 A2 * | 1/2006 |
| JP | 2006295326 | 10/2006 |
| WO | 2004070923 | 8/2004 |

* cited by examiner

METHOD AND CONTROL DEVICE FOR PROTECTION TIME SETTING IN AN ELECTRIC DRIVE SYSTEM

BACKGROUND OF THE INVENTION

The invention relates to a method and a control device for protection time setting in an electric drive system comprising an electric machine and a pulse-controlled inverter in particular when controlling semiconductor switches of a pulse-controlled inverter.

Electric machines with a pulse-controlled inverter are used in hybrid vehicles, for example, where they are optionally operated in the motor or generator mode. In the motor mode, the electric machine generates an additional driving torque that supports the internal combustion engine in an acceleration phase, for example; in the generator mode, it generates electrical energy that is stored in an energy store, such as a battery or a super-cap, for example. The operating mode and power of the electric machine are set by means of the pulse-controlled inverter.

Known pulse-controlled inverters comprise a series of switches used for optionally switching the individual phases of the electric machine relative to a high potential, the so-called intermediate circuit voltage, or relative to a low reference potential, in particular ground. The switches are controlled by an external control unit which calculates a desired operating point for the electric machine depending on the driver's desire (acceleration or breaking). The pulse-controlled inverter is connected to the control unit and receives the corresponding operating data and/or control commands from said control unit.

In the case of a disturbance or a fault, for example in the event of an excessively high battery current or an excessively high supply lead current, the pulse-controlled inverter is switched to a safe state in order to prevent possible damage to electrical components. In this case, various switching states can be realized in conventional methods.

By way of example, all switches connected to the low potential so-called low-side switches can be closed and all switches connected to the high potential, so-called high-side switches can be opened. This operating mode is also designated as a short-circuit state with respect to low potential. Alternatively, it is also possible for all the high-side switches to be closed and all the low-side switches to be opened, thus giving rise to a short-circuit state with respect to high potential. In a different turn-off method, all switches of the pulse-controlled inverter are opened. This is also designated as a freewheeling mode.

The document DE 10 2006 003 254 A1 discloses for example a combination of turn-off methods: since for example the phase current can still rise for a short time after the switch-over to the short-circuit state, said document proposes using both known turn-off operating modes sequentially and switching the electric machine firstly into the freewheeling mode and then into the short-circuit state.

The freewheeling mode is activated in each case for a specific protection time, such that on account of switch-off delays or residual voltages it is always possible to ensure that no short circuit between high and low potentials occurs. This protection time is subject to certain tolerances in the case of a setting via hardware, for example on account of temperature fluctuations or fluctuations governed by the operation duration. In contrast thereto, in the case of setting of the protection time via the control software of pulse-controlled inverters a precise setting can be effected, although the software cannot react to fault reactions in the hardware.

The document DE 94 13 274 U1 discloses a gate array for the pulse width modulation with control signals for pulse-controlled inverters with a microprocessor for generating PWM signals and devices for dead time compensation, for DC component suppression and for latching.

There is a need for solutions which can ensure the safety and robustness of an electric drive system in all fault cases, in particular in the event of a fault-induced transition between different operating states of a pulse-controlled inverter.

SUMMARY OF THE INVENTION

The present invention therefore provides a control device for controlling a pulse-controlled inverter of an electric drive system, comprising an open-loop/closed-loop control circuit which is designed to generate pulse-width-modulated control signals for switching devices of the pulse-controlled inverter, a fault logic circuit, which can detect fault states in the drive system and which is designed to select a switching state or a sequence of switching states for the switching devices of the pulse-controlled inverter which are assigned to the corresponding fault state, and a protection circuit, which is embodied in hardware and which comprises a signal delay device, which is designed to delay the control signals in order to implement a minimum protection time, and a latching device, which is designed to latch two complementary switching devices of a bridge branch of the pulse-controlled inverter with respect to one another.

In accordance with a further embodiment, the invention provides a system comprising a control device according to the invention, a pulse-controlled inverter having a multiplicity of switching devices in a full-bridge circuit, which are controlled via the control device, and an electric machine, which is supplied with an electrical supply voltage by the pulse-controlled inverter.

In accordance with a further embodiment, the invention provides a method for controlling a pulse-controlled inverter of an electric drive system, comprising the following steps of generating pulse-width-modulated control signals for switching devices of the pulse-controlled inverter in a software circuit, detecting a fault state in the drive system, selecting a switching state or a sequence of switching states for the switching devices of the pulse-controlled inverter which are assigned to the corresponding fault state, and delaying the control signals in order to implement a minimum protection time and latching two complementary switching devices of a bridge branch of the pulse-controlled inverter in a hardware circuit.

A fundamental concept of the invention is that of combining two mechanisms for setting a protection time for the control of power switching elements of a pulse-controlled inverter. Firstly, a setting of the protection time via control software is effected, such that the length of the protection time can influence the closed-loop control and can be dynamically adapted. Secondly, a downstream setting of the protection time is effected in a hardware circuit connected downstream of the control software, for example in a programmable logic component with a computer clocking, in order to be able to ensure a minimum protection time and a failsafe latching between high-side and low-side switches of the controlled pulse-controlled inverter.

By means of a logic hardware element upstream of the driver stage of the power switching elements, it is advantageously possible to implement the minimum protection measures, for example the setting of a minimum protection time and a failsafe latching of complementary power switching elements in a half-bridge arrangement without adversely influencing the closed-loop control of the switching times in the software.

BRIEF DESCRIPTION OF THE DRAWINGS

Further features and advantages of embodiments of the invention will become apparent from the following description with reference to the accompanying drawings.

In the figures

DETAILED DESCRIPTION

Figure 1:
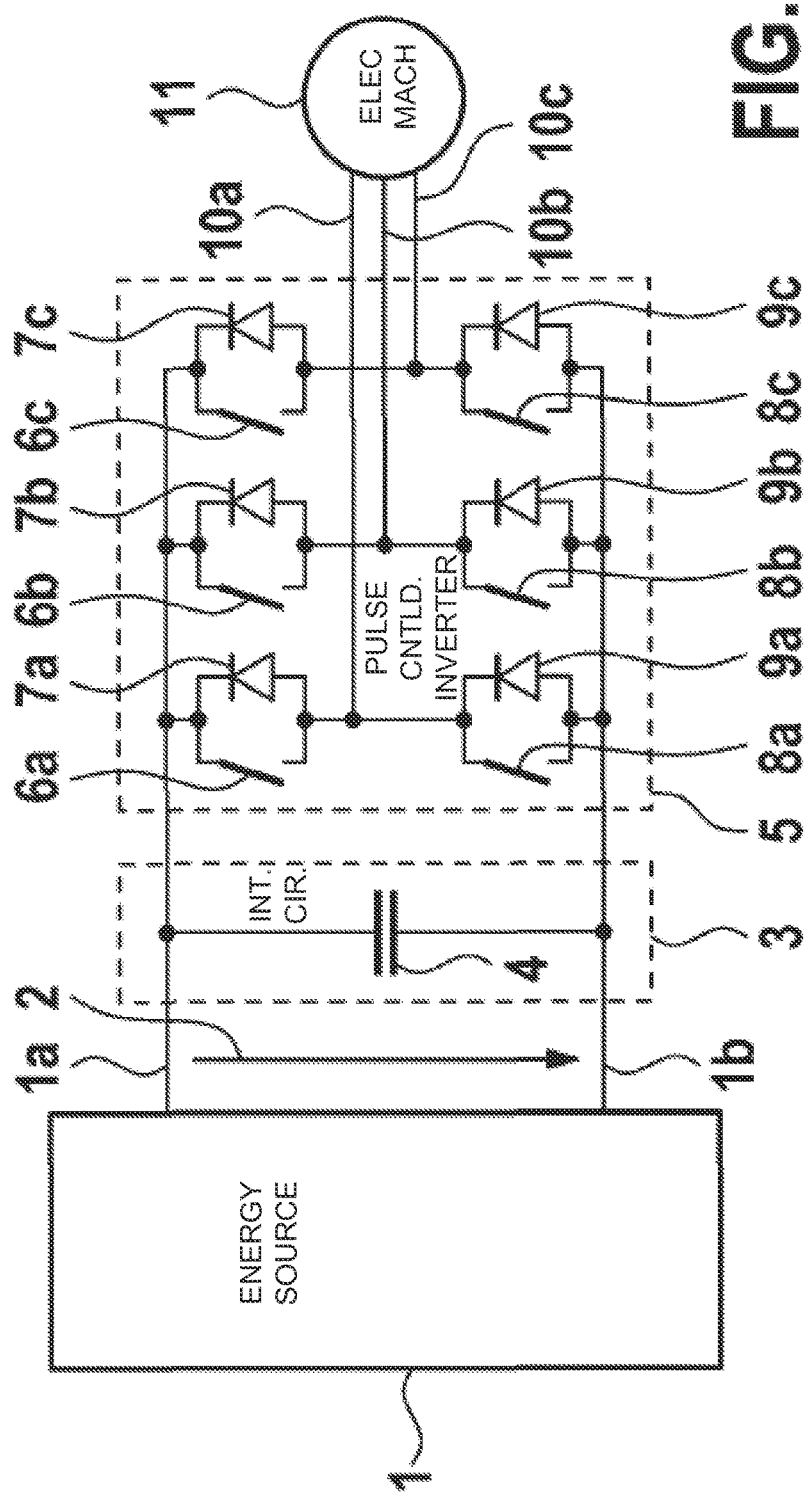
FIG. 1 shows a schematic illustration of an electric drive system with a pulse-controlled inverter.

FIG. 1 shows a schematic illustration of an electric drive system. The electric drive system comprises an energy source 1 for example a high-voltage source such as a traction battery, which can provide a supply voltage 2. The energy source 1 can be designed as an energy store 1, for example, in a drive system of an electrically operated vehicle. It is also possible for the energy source 1 to be grid-based, that is to say for the electric drive system to obtain electrical energy from an energy supply grid. The supply voltage 2 can be applied to supply connections of a pulse-controlled inverter 5 via an intermediate circuit 3 having an intermediate circuit capacitor 4. In this case, a connection 1a of the energy source 1 is at high potential, and a connection 1b of the energy source 1 is at low potential, for example ground. The pulse-controlled inverter 5 can have a three-phase output, for example, a three-phase electric machine 11 being connected to the pulse-controlled inverter 5 via power connections 10a, 10b, 10c.

The pulse-controlled inverter 5 can have for this purpose in three supply branches in each case switching devices having switches 6a, 6b, 6c, 8a, 8b, 8c and assigned freewheeling diodes 7a, 7b, 7c, 9a, 9b, 9c respectively connected in parallel, which are arranged in a six-pulse rectifier bridge circuit. In this case, the switches 6a, 6b, 6c are designated a high-side switches and the switches 8a, 8b, 8c are designated as low-side switches. In this case, the switches 6a, 6b, 6c, 8a, 8b, 8c can be for example semiconductor switches, by way of example MOSFET switches or IGBT switches.

The pulse-controlled inverter 5 is designed, via corresponding control of the switches 6a, 6b, 6c, 8a, 8b, 8c, to switch the phase or power connections 10a, 10b, 10c of the electric machine 1 alternately with respect to a high supply potential 1a, for example the supply voltage 2, or a low reference potential 1b, for example a ground potential. The pulse-controlled inverter 5 determines the power and operating mode of the electric machine 11 and is correspondingly controlled by a control unit (not shown in FIG. 1).

The electric machine 11 can thus optionally be operated in the motor or generator mode. In the motor mode, it generates an additional driving torque that supports an internal combustion engine in an acceleration phase, for example. In the generator mode, by contrast, mechanical energy can be converted into electrical energy and stored in the energy store 1 or fed back into an electrical supply grid. The intermediate circuit 3, which can comprise the intermediate circuit capacitor 4 for voltage stabilization, serves for supplying the pulse-controlled inverter 5 with the supply voltage 2.

Figure 2:
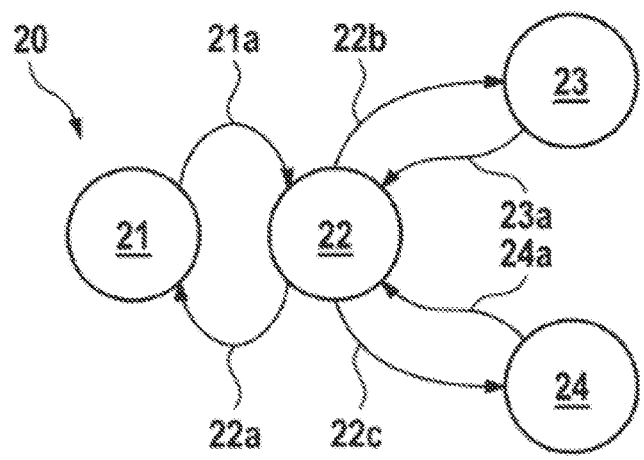
FIG. 2 shows a schematic illustration of a state diagram for various switching states of a pulse-controlled inverter.

FIG. 2 shows a schematic illustration of a state diagram 20 of various operating and switching states of the electric drive system shown in FIG. 1. The state 21 is a normal operating state which permits a corresponding control of the pulse-controlled inverter 5 if no fault or no disturbance is present in the electric drive system. If a fault is detected, a transition can be made in a state transition 21a from the normal operating state 21 into a freewheeling mode 22. The freewheeling mode 22 is characterized in that all switches 6a, 6b, 6c, 8a, 8b, 8c are open and a current possibly present in the electric machine 11 is conducted via the freewheeling diodes 7a, 7b, 7c, 9a, 9b, 9c and is thus reduced or entirely dissipated.

It is advantageous if the freewheeling mode 22 is left after a certain period of time. If the fault has already been rectified or is no longer detected, a transition can be made again to the normal operating state 21 in a state transition 22a. However, if the fault still exists, a state transition to a safe short-circuit state can be provided, proceeding from the freewheeling mode 22.

For this purpose, one of the switching states 23 or 24, to which a transition can be made from the freewheeling mode 22 by means of state transitions 22b or 22c respectively, is selected depending on the type of fault detected. In this case, the switching state 23 is a short-circuit state 23 with respect to low potential 1b, for example with respect to a reference potential such as a ground potential. In the short-circuit state 23, the low-side switches 8a, 8b, 8c are closed, while the high-side switches 6a, 6b, 6c are open. In this state, therefore, the power connections 10a, 10b, 10c are in each case connected to the low potential 1b. This enables a current flow through the freewheeling diodes 9a, 9b, 9c or the low-side switches 8a, 8b, 8c. By contrast, the switching state 24 is a short-circuit state 24 with respect to high potential 1a, for example with respect to a supply potential. In the short-circuit state 24, the low-side switches 8a, 8b, 8c are open, while the high-side switches 6a, 6b, 6c are closed. In this state, therefore, the power connections 10a, 10b, 10c are in each case connected to the high potential 1a. This enables a current flow through the freewheeling diodes 7a, 7b, 7c or the high-side switches 6a, 6b, 6c.

Figure 3:
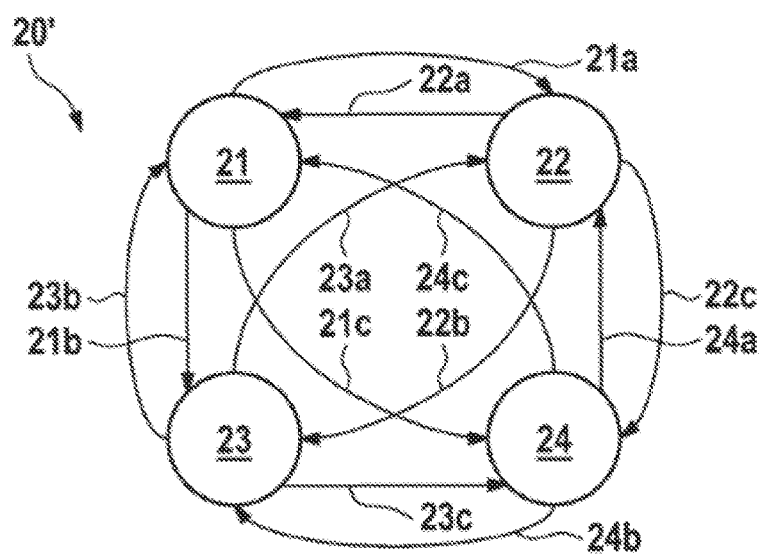
FIG. 3 shows a schematic illustration of a state diagram for various switching states of a pulse-controlled inverter in accordance with one embodiment of the invention.

FIG. 3 shows a schematic illustration of an improved state diagram 20' of various operating and switching states of the electric drive system shown in FIG. 1. The state diagram 20' differs from the state diagram 20 in that from each of the four switching states (normal operating state 21, freewheeling mode 22, short-circuit state 23 with respect to low potential 1b and short-circuit state 24 with respect to high potential 1a) it is possible to change directly to another switching state. By way of example, via state transitions 21b and 21c it is possible to change from the normal operating state 21 to the short-circuit state 23 with respect to low potential 1b and, respectively, the short-circuit state 24 with respect to high potential 1a. From the short-circuit states 23 and 24, it is possible to change either to the normal operating state 21 or the freewheeling mode 22 respectively via state transitions 23a and 23b, and 24a and 24c. It is likewise possible to change directly from one short-circuit state to the other via state transitions 23c or 24b.

Depending on the state change, it should be taken into consideration here that the switching processes of the switches 6a, 6b, 6c and/or 8a, 8b, 8c, depending on the switching technology used, takes up a specific time, for example a few hundred nanoseconds and a temporal overlap of the switching processes in the switches of a phase supply branch of the pulse-controlled inverter 5 would short-circuit the high potential 1a with the low potential 1b, which can lead to the switches involved being damaged or even destroyed.

Therefore, in a control circuit a minimum protection time is provided in which respectively two semiconductor switches of a bridge circuit branch of the pulse-controlled inverter 5, that is to say respectively pairs of a high-side switch and a low-side switch, are both in the open state in order reliably prevent short circuits from occurring in the respective bridge circuit branch.

Figure 4:
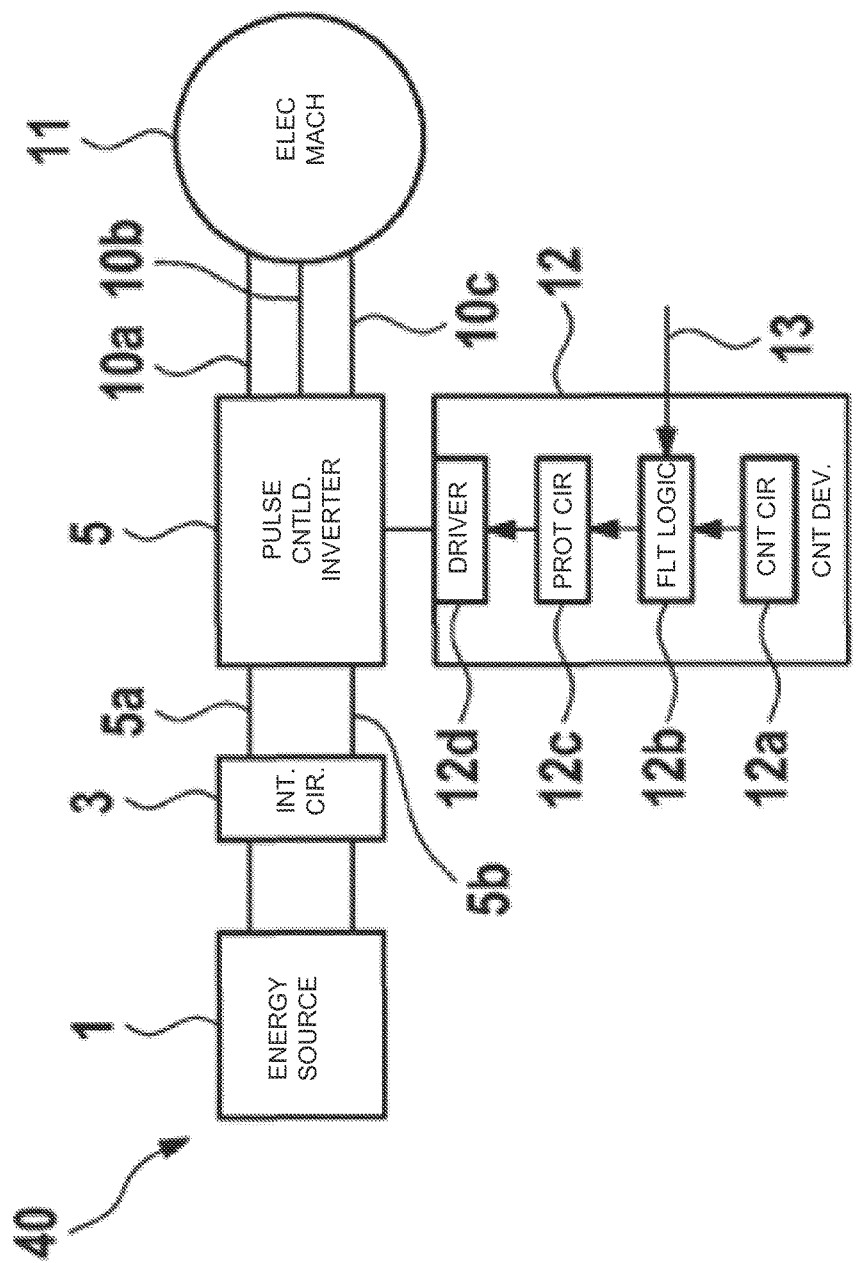
FIG. 4 shows a schematic illustration of an electric drive system comprising a pulse-controlled inverter and a control device for controlling the pulse-controlled inverter in accordance with a further embodiment of the invention.

FIG. 4 shows a schematic illustration of an electric drive system 40 comprising a pulse-controlled inverter 5 and a control device 12 for controlling the pulse-controlled inverter 5. In this case, the pulse-controlled inverter 5 comprises a first supply connection 5b and a second supply connection 5a, which can respectively be connected to a high potential and a low potential. In this case, the electric drive system 40 differs from the electric drive system shown in FIG. 1 in that a control device 12 is provided, which is designed to control the switching devices of the pulse-controlled inverter 5. For this purpose, the control device 12 comprises an open-loop/closed-loop control circuit 12a, a fault logic circuit 12b, a protection circuit 12c and a driver circuit 12d.

The open-loop/closed-loop control circuit 12a is designed to generate control signals for the switching devices of the pulse-controlled inverter 5. By way of example, the open-loop/closed-loop control circuit 12a can be configured in a microprocessor in which corresponding pulse width modulation signals for the pulse-controlled inverter 5 can be generated via control software. In this case, the open-loop/closed-loop control circuit 12a can furthermore be designed to dynamically set protection times for the control of complementary switching devices in bridge circuit branches of the pulse-controlled inverter 5 already in the closed-loop control algorithms used. The protection times generated by the open-loop/closed-loop control circuit 12a can depend for example on the instantaneous operating state or switching state of the electric drive system 40. By way of example, said protection times can be dynamically adapted by the open-loop/closed-loop control circuit in the case of the requirement of an operating state change, for example in the case of a change from a normal operating state 21 into a freewheeling mode 22.

A fault logic circuit 12b is connected downstream of the open-loop/closed-loop control circuit 12a. Besides the control signals for the switching devices of the pulse-controlled inverter 5 that are generated by the open-loop/closed-loop control circuit 12a, the fault logic circuit 12b can process fault signals 13 of a fault detection device (not illustrated). The fault detection device can be designed to detect faults in the electric drive system 40 and to forward them as a fault signal 13 to the fault logic circuit 12b. The fault logic circuit 12b is designed to select, depending on the detected fault or faults of the fault detection device, a switching state or a sequence of switching states which are assigned to the corresponding fault pattern. By virtue of the fact that the fault logic circuit 12b is arranged downstream of the open-loop/closed-loop control circuit 12a, it is possible to react to fault signals via the protection circuit 12c, that is to say that a reaction to fault signals in the software of the open-loop/closed-loop control circuit 12a is not necessary. This improves the safety and reliability of the control device 12 since, independently of a failure of the software of the open-loop/closed-loop control circuit 12a fault reactions can be processed in the protection circuit 12c.

The protection circuit 12c receives the control signals—modified by the fault logic circuit 12b—for the switching devices of the pulse-controlled inverter 5. The protection circuit 12c can be designed to provide a minimum protection time for the control signals independently of the protection times set by the open-loop/closed-loop control circuit 12a for the switching devices. Furthermore, the protection circuit 12c can be designed to implement a latching protection which ensures that pairwise controlled high-side and low-side switches of a bridge circuit branch of the pulse-controlled inverter 5 are latched with respect to one another, that is to say that it is impossible for both switching devices of such a pair of switches to be closed simultaneously.

For this purpose, the protection circuit 12c can preferably be constructed using hardware, for example using discrete logic or a programmable logic component or in combinations of the possibilities mentioned.

The control signals—if appropriate modified by the protection circuit 12c—for the switching devices of the pulse-controlled inverter 5 are processed by a driver circuit 12d. The driver circuit 12d forms the interface between the low-voltage control device 12 and a high-voltage control circuit for the switching devices of the pulse-controlled inverter 5. The protection circuit 12c is thus the last logic element upstream of the driver circuit 12d, such that a minimum protection time and a latching mechanism can be reliably implemented in any case, that is to say in particular also independently of the closed-loop control of the open-loop/closed-loop control circuit 12a.

Figure 5:
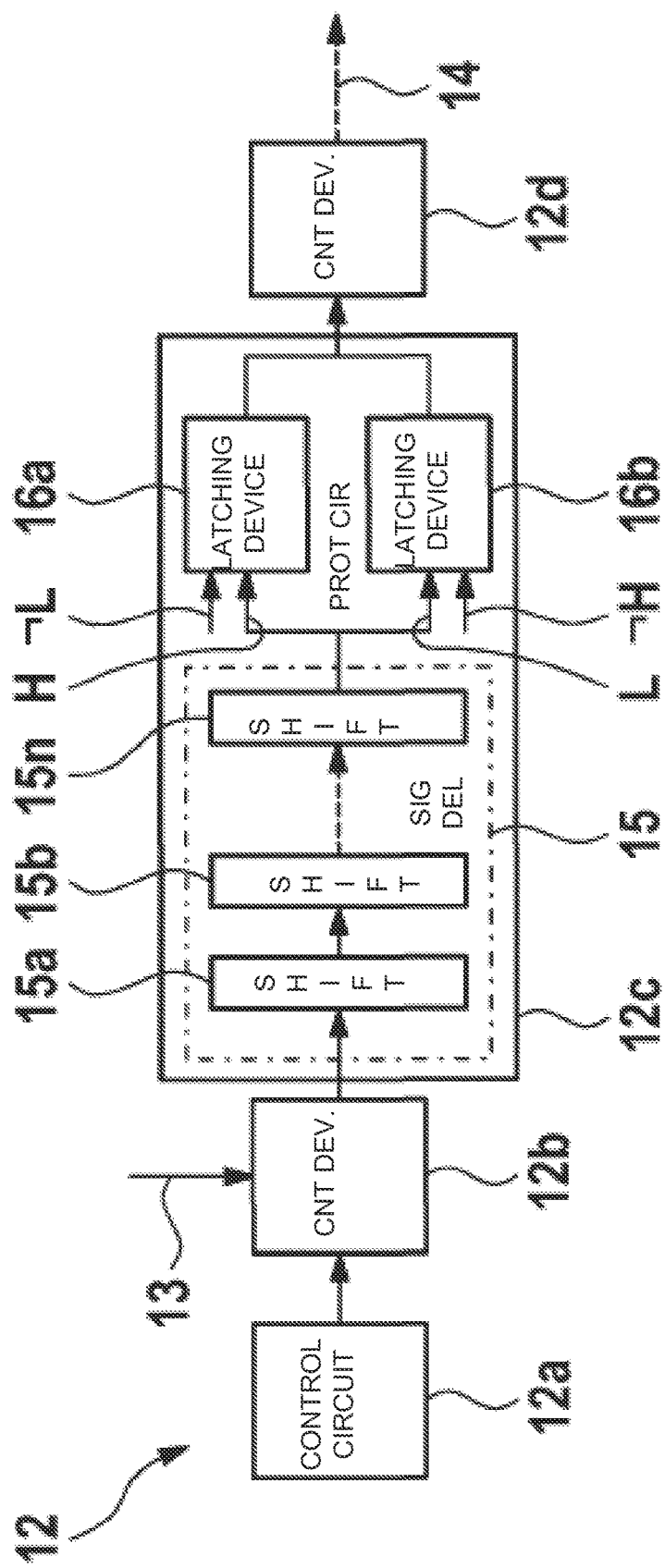
FIG. 5 shows a schematic illustration of a control device according to FIG. 4 in greater detail in accordance with a further embodiment of the invention.

FIG. 5 shows a schematic illustration of a control device 12 according to FIG. 4 in greater detail. The control device 12 in FIG. 5 differs from the control device 12 in FIG. 4 to the effect that possible components of the protection circuit 12c are shown in greater detail in accordance with one embodiment.

The protection circuit 12c comprises a signal delay device 15, which is coupled to a latching device 16a, 16b. In this case, the signal delay device 15 can comprise a multiplicity of shift registers 15a, 15b, . . . 15n, which receive the control signals from the fault logic circuit 12b and which are designed to shift the control signals by a predetermined period of time. The signal delay device 15 can be designed, for example, to define an adjustable length of the minimum protection time via the delay of the control signals by the shift registers 15a, 15b, . . . 15n. The number of shift registers 15a, 15b, . . . 15n is indicated with three merely by way of example in FIG. 5; it goes without saying that any other number of shift registers is likewise possible. By way of example, the granularity of the minimum protection time can be adapted via the number of selectable shift registers of the signal delay device 15. The shift registers 15, 15b, . . . 15n can be D-type flip-flop circuits, for example, which are clocked via the computer clock of the open-loop/closed-loop control circuit 12a. A dedicated shift register chain 15a, 15b, . . . 15n is advantageously provided for the control signals of each switching device of the pulse-controlled inverter 5. The shift registers 15a, 15b, . . . 15n can be clocked for example via the computer clock of the open-loop/closed-loop control circuit 12a.

The protection circuit 12c furthermore comprises latching devices 16a, 16b, which are designed to ensure a latching of complementary switching devices of a bridge branch of the pulse-controlled inverter 5. The latching device 16a receives as input signals the control signal H for the high-side switches and the negated control signal ¬L, for the low-side switches. As output signal, the latching device 16a, which may be constructed for example as a logic AND gate generates an output signal corresponding to the logic ANDing of the control signal H and the control ¬L. In this way, the control signal H for the high-side switches can be enabled only when the low-side switches are reliably closed. The latching device 16b receives as input signals the control signal L for the low-side switches and the negated control signal ¬H for the high-side switches. As output signal, the latching device 16b which may be constructed for example as a logic AND gate generates an output signal corresponding to the logic ANDing of the control signal L and the control signal H. In this way, the control signal L for the low-side switches can be enabled only when the high-side switches are reliably closed.

Figure 6:
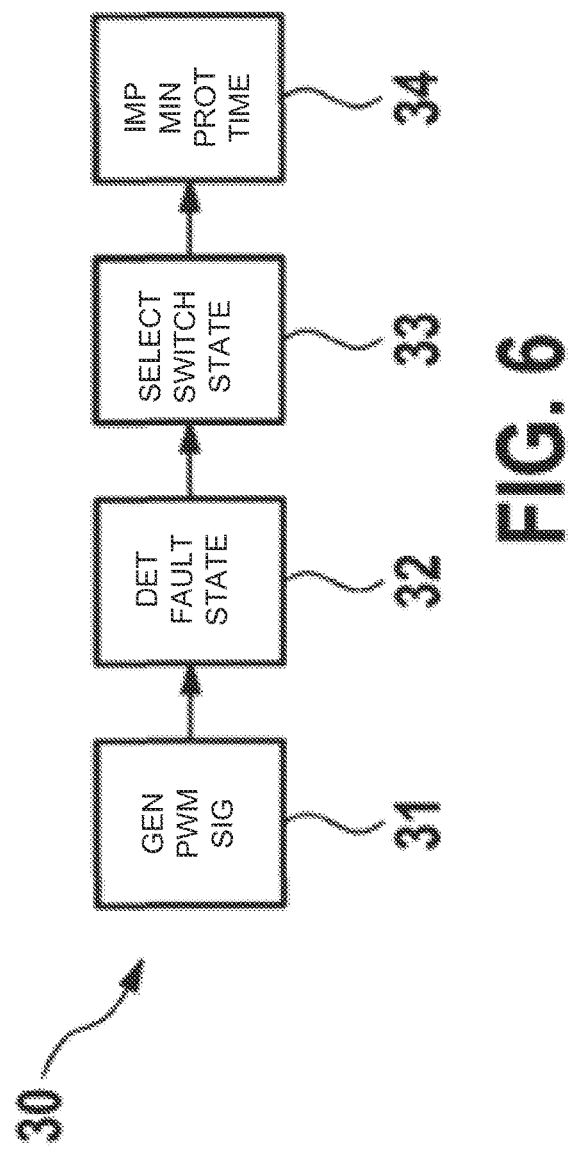
FIG. 6 shows a schematic illustration of a method for controlling a pulse-controlled inverter in accordance with a further embodiment of the invention.

FIG. 6 shows a schematic illustration of a method 30 for controlling a pulse-controlled inverter. A first step 31 involves generating pulse-width-modulated control signals for switching devices of the pulse-controlled inverter in a software circuit. A second step 32 involves detecting a fault state in the drive system. A third step 33 involves selecting a switching state or a sequence of switching states for the switching devices of the pulse-controlled inverter which are assigned to the corresponding fault state. A fourth step 34 involves delaying the control signals in order to implement a minimum protection time and latching two complementary switching devices of a bridge branch of the pulse-controlled inverter in a hardware circuit. The method 30 can be used, in particular for operating an electric drive system such as is illustrated in FIGS. 4 and 5.

The invention claimed is:

1. A control device (12) for controlling a pulse-controlled inverter (5) of an electric drive system, comprising:
    an open-loop/closed-loop control circuit (12a) embodied as a microprocessor and configured to generate pulse-width-modulated control signals for switching devices of the pulse-controlled inverter (5) to dynamically adjust protection times for driving complementary switching devices in a bridge branch of the pulse-controlled inverter (5);
    a fault logic circuit (12b), which can detect fault states in the drive system and configured to select a switching state or a sequence of switching states for the switching devices of the pulse-controlled inverter (5) which are assigned to the corresponding fault state;
    a protection circuit (12c), which is embodied in hardware and which comprises
        a signal delay device (15), configured to delay the control signals in order to implement a minimum protection time, and
        a latching device (16a, 16b), configured to latch two complementary switching devices of a bridge branch of the pulse-controlled inverter (5) with respect to one another; and
    a driver circuit (12d), configured to drive the switching devices of the pulse-controlled inverter (5) depending on the control signals output by the protection circuit (12c);
    wherein the protection circuit (12c) is the last logic element upstream of the driver circuit (12d) and is independent of the open-loop/closed-loop control circuit (12a); and
    wherein the arrangement of the hardware protection circuit (12a) enables the setting of the minimum protection time and a failsafe latching of complementary power switching elements in the inverter (5) without adversely influencing open-loop/closed-loop control circuit software control of the switching times.

2. The control device (12) as claimed in claim 1, wherein the signal delay device (15) comprises a multiplicity of shift registers (15a, 15b, 15n), which are clocked via the computer clock of the open-loop/closed-loop control circuit (12a).

3. The control device (12) as claimed in claim 1, wherein the latching device (16a, 16b) comprises at least two logic AND gates, which receive as input signals a control signal of a first switching device and a negated control signal of a second switching device, which is complementary to the first switching device.

4. A system, comprising:
    a control device (12) as claimed in claim 1;
    a pulse-controlled inverter (5) having a multiplicity of complementary switching devices in a full-bridge circuit, which are controlled via the control device; and
    an electric machine (1), which is supplied with an electrical supply voltage by the pulse-controlled inverter (5).

5. A method for controlling a pulse-controlled inverter (5) of an electric drive system, comprising:
    generating, by a microprocessor, pulse-width-modulated control signals for complementary switching devices of the pulse-controlled inverter (5) in a software circuit;
    setting dynamic protection times for the activation of the complementary switching devices in bridge branches of the pulse-controlled inverter (5);
    detecting a fault state in the drive system;
    selecting a switching state or a sequence of switching states for the switching devices of the pulse-controlled inverter (5) which are assigned to the corresponding fault state; and
    delaying, by a protection circuit (12c), the control signals in order to implement a minimum protection time; and
    latching two complementary switching devices of a bridge branch of the pulse-controlled inverter (5) in a hardware circuit;
    wherein the protection circuit (12c) is the last logic element upstream of a driver circuit (12d) for driving he pulse-controlled inverter (5) and is independent of the software circuit; and
    wherein the arrangement of the hardware protection circuit enables the setting of the minimum protection time and a failsafe latching of the two complementary switching devices without adversely influencing the software control of the pulse-width-modulated control signals.

* * * * *